April 28, 1942.   W. G. HARDING ET AL   2,281,286
CORRECTION DEVICE FOR GYROSCOPIC COMPASSES AND THE LIKE
Original Filed May 5, 1938   3 Sheets-Sheet 1
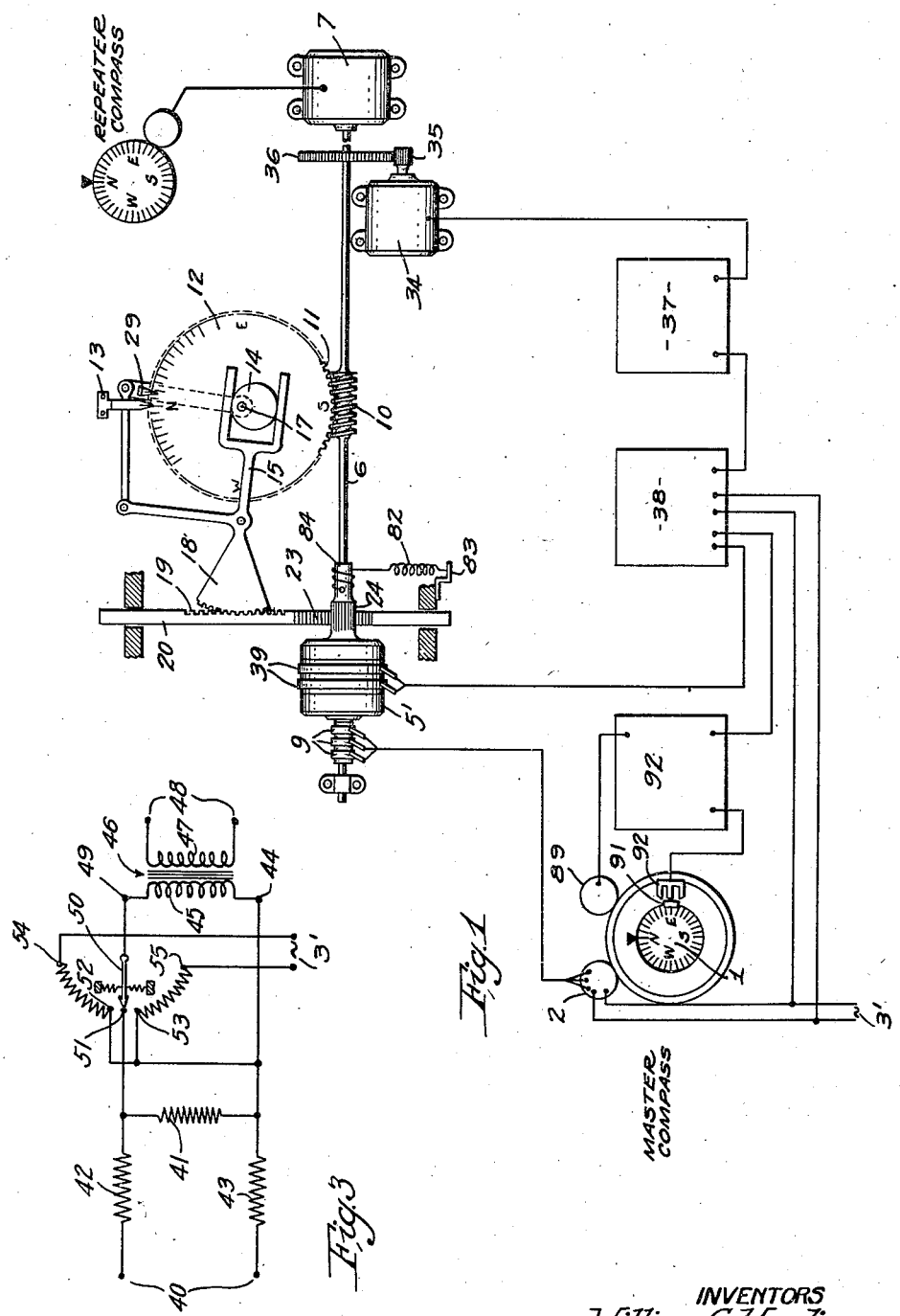
INVENTORS
William G. Harding
Robert H. Nisbet,
BY
Herbert H. Thompson
ATTORNEY

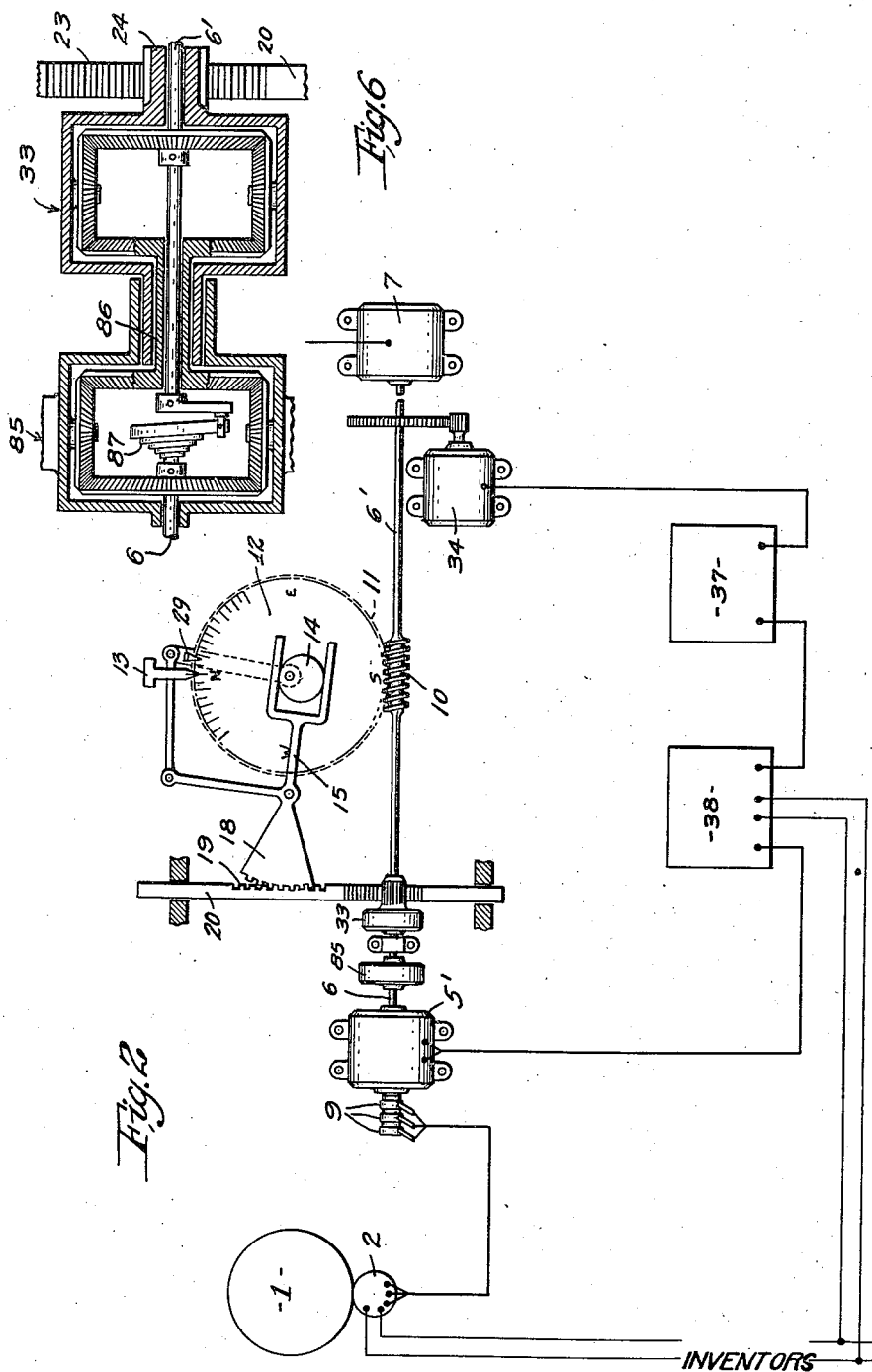

April 28, 1942. W. G. HARDING ET AL 2,281,286
CORRECTION DEVICE FOR GYROSCOPIC COMPASSES AND THE LIKE
Original Filed May 5, 1938   3 Sheets-Sheet 3

INVENTOR
William G. Harding
Robert H. Nisbet,
BY
Herbert H. Thompson
their ATTORNEY Patented Apr. 28, 1942

2,281,286

UNITED STATES PATENT OFFICE 2,281,286

CORRECTION DEVICE FOR GYROSCOPIC COMPASSES AND THE LIKE

William G. Harding, Whitton, and Robert H. Nisbet, Osterley, England, assignors to Sperry Gyroscope Company, Inc., Brooklyn, N. Y., a corporation of New York Original application May 5, 1938, Serial No. 206,208. Divided and this application October 19, 1939, Serial No. 300,182. In Great Britain May 7, 1937

7 Claims. (Cl. 33—126)

This application is a division of our copending application, now Patent No. 2,273,808, dated February 17, 1942, for Systems for transmitting indications.

The present invention relates to transmission systems for transmitting indications from a measuring or indicating instrument, such as a magnetic or gyroscopic compass, and in particular to means for introducing corrections into the transmission means so as to correct for errors of known type in the instrument.

In accordance with the present invention we provide a system for controlling a controlled object so that the same moves non-proportionally (e. g. for introducing a systematic correction) to the movements of a controlling object or instrument, wherein the controlled object is moved by a servo-motor turning proportionally therewith and controlled by means operated in part by the instrument or by a repeater reproducing the position of the instrument and in part by a follow-back from the servo-motor, the required degree of non-proportionality of the operation being obtained by the use of a non-proportional (or correction-introducing) device in the follow-back connection.

In order that the invention may be fully understood and carried into effect, various embodiments thereof will now be described by way of example with reference to the accompanying drawings, in which:

Fig. 1 is a diagrammatic lay-out of a system in accordance with the present invention;

Fig. 2 shows another embodiment of the invention;

Fig. 3 is a diagram of the circuit arrangements of part of the system of Fig. 1;

Fig. 6 illustrates a detail of Fig. 2.

Figure 4:
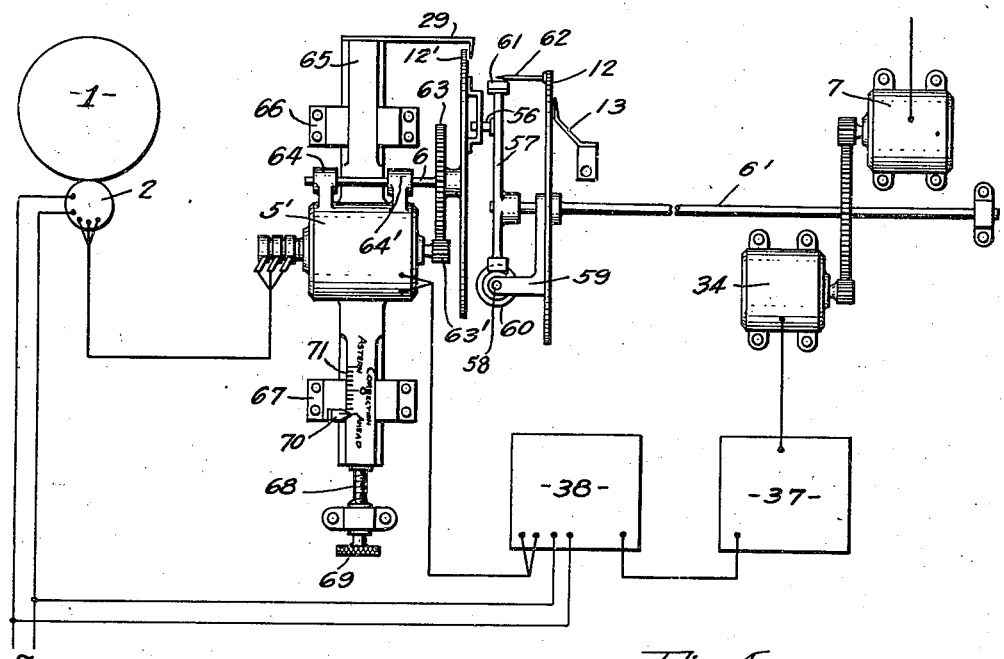
Fig. 4 illustrates a further embodiment of the invention.

All these figures relate to systems in which the controlling object or instrument is a gyro-compass. As is well known, a gyro-compass is subject to systematic errors depending on the speed and direction of motion of the ship on which the gyro-compass is carried, and also depending on the latitude of the ship. In the systems illustrated a transmitter transmits indications from the gyro-compass, and a controlled object, mounted for example on the ship's bulkhead, is moved by a servomotor to follow the indications transmitted from the compass, the following movement, however, being non-proportional with the movements of the compass in that the controlled body is corrected for the aforesaid systematic errors of the compass. The non-proportionality results from the use of a corrector mechanism, and in accordance with the principles of the present invention, this mechanism is inserted in the follow-back from the servomotor to a controller operated from the gyro-compass.

Fig. 1 shows a system similar to that described with reference to our aforesaid parent application, to which reference is directed, but wherein a servomotor 34 is employed, coupled to a shaft 6 through gearing 35, 36, and wherein transmitter 2 is a "Selsyn" transmitter energized from an alternating current supply 3'. The receiver 5' is a receiver of the "Selsyn" type, but the single-phase winding on the stator, instead of being excited from the alternating current supply as in an ordinary "Selsyn" transmission, is connected to the amplifier 37 through the synchronizer 38: said winding therefore acts as the secondary winding of a variable rotary transformer. Since this winding has induced in it an electrical signal proportional to its position relative to the three-phase winding, a "Selsyn" device used in this manner, is often referred to as a "Selsyn signal generator." Connections are made to the rotor of receiver 5' via slip rings 9, and to the stator via slip rings 39.

The amplifier 37 causes the servomotor 34 to run until the input to the amplifier 37 is zero. An amplifier suitable for this purpose is shown in U. S. application, Serial No. 148,670, filed June 17, 1937, for Position control systems, R. H. Nisbet, inventor.

Servomotor 34 will thus cause shaft 6 to rotate the rotor of receiver 5' relatively to the stator through the angle turned through by transmitter 2. A correction for errors of the compass is applied by a corrector-mechanism to rotate the stator of receiver 5'. The corrector-mechanism shown is a variation of that described in Patent No. 2,128,559, to which reference may be made for the theory of its operation. A more detailed explanation of the operation of the particular variation illustrated can also be found in the aforesaid parent application, with reference to Fig. 1 of that application. It is sufficient to remark here that cam 14 is an eccentric whose eccentricity is adjustable in accordance with the ship's speed and latitude, and that, as the servomotor 34 rotates, this cam oscillates the lever 15 and applies the required corrections through the rack-bar 19 to rotate the stator of receiver 5'. The receiver 5' is the controller for the motor 34, and this controller is affected by the motor (the follow-back action) directly through the shaft 6, and indirectly to provide the correction through the correction mechanism and rack-bar 19. The correction is thus introduced in the follow-back connection, the repeater 5' serving as a kind of electrical differential. It is also possible to apply the correction by means of a mechanical differential 33, and such a system is shown in Fig. 2. In this arrangement, the stator of receiver 5' remains stationary, so that slip rings 39 are not required for making electrical connections to the stator winding. The systems of Figs. 1 and 2 operate generally in the same manner as does that described in relation to Fig. 1 of the drawings of the application aforementioned. The advantage of using the servomotor 34 is particularly apparent when "Selsyn" relay transmission is employed (i. e., when the transmitters 7 are "Selsyn" transmitters transmitting to a large number of "Selsyn" receivers). In this case, the frictional and driving loads of the receivers become effective on the transmitters 7, and the torque required to turn these is greater than can be provided with accuracy by a receiver such as 5' alone.

In a practical form of the system of Fig. 1 the stator and rotor of the receiver 5' may be interchanged, that is to say; the servo motor 34 is geared to the stator, whereas the corrector lever 15 is geared to the rotor. In this way the load on the corrector is still further lightened, since it is easier to turn the rotor than the stator. Moreover, the worm gearing 10, 11 may be replaced by a train of spur gears, as may also be rack-and-pinion gearing 23, 24, and rack-and-gear sector 18, 19. The member 20 is in this case replaced by a gear turning about an axis parallel to the axis 17 of card 12. The servo motor 34, the receiver 5', and all the gears, therefore, have parallel axes and can be disposed around card 12.

Fig. 3 is a diagram of the circuit arrangements in one form of synchronizer for use at 38 in the system of Fig. 1. The input terminals 40 receive the output from the receiver or variable transformer 5' of Fig. 1. This input is applied to the resistance 41 through resistances 42, 43. One side of resistance 41 is connected to terminal 44 of the primary winding 45 of a transformer 46, the secondary winding 47 of this transformer being connected to the output terminals 48, which are connected to the amplifier 37 of Fig. 1. The other terminal 49 of the primary winding 45 is connected to a rotary contact arm 50, which is spring-constrained to a central position in which it makes contact with a contact stud 51 connected to resistance 41. Under normal conditions, therefore, the primary winding 45 is connected across the resistance 41, so that the voltage developed across resistance 41, which voltage is part of the input voltage from the variable transformer 5', is applied to transformer 46 and therefore to the amplifier 37.

If, initially, the indication given by card 12 differs from that given by compass card 1 by more than half a revolution of the receiver 5', it becomes necessary to supersede this normal condition of operation by a manually controlled condition. For this purpose, a handle (not shown) is provided for turning the rotary contact arm 50 to one side or the other against the centralizing springs.

The first movement of the arm 50 breaks the contact of the arm with stud 51, thus disconnecting the output from the normal input from the variable transformer 5'. The next movement takes the contact arm 50 to contact stud 52 or 53 according to the direction of movement. These two studs are connected together, and to terminal 44 of the primary winding 45 of transformer 46. This winding 45 is therefore short-circuited, and the output of the transformer 46 is consequently zero. The studs 52 and 53 are respectively connected through potentiometer windings with terminals 54 and 55, which are connected to the source of alternating current 3' of Fig. 1. Movement of contact arm 50 beyond either studs 52, 53 causes it to move over one of the potentiometer windings and to produce an increased alternating current voltage in the primary circuit winding 45 of transformer 46. In this way, sufficient input may be given to the amplifier 37 to run the servo motor 34 at any desired speed in either direction at will, and when arm 50 is released, the system reverts at once to automatic operation.

In Figs. 1 and 2 we have shown examples of relay transmission in which a servomotor is used to provide the necessary power to drive the transmitter (or transmitters) 7, and we have employed therein the principle that the servomotor 34 is directly coupled to the transmitter 7 so as to turn proportionally therewith, the correction being inserted between the servomotor 34 and the controller for the servomotor (i. e., receiver 5'). This feature is an important one, and it is embodied also in the forms of the invention shown in Figs. 4 and 5.

In Fig. 4, the transmitter 2 geared to the compass 1 is of the "Selsyn" type energized from alternating current mains as in Figs. 1 and 2. It transmits to a receiver 5', and a control voltage is obtained from the stator for controlling the servomotor 34 through synchronizer 38 and amplifier 37, as before. Servomotor 34 is directly geared to the "corrected" shaft 6' and to the relay transmitters, one of which is shown at 7.

Servomotor 34 has a follow-back connection to the rotor of receiver 5', as explained herein, and the corrector mechanism is included in this follow-back, so that, although the repeater 5' turns proportionally to the uncorrected indication of compass 1, shaft 6' turns proportionally to a compass indication that is corrected. For this reason, there is secured to the shaft 6' the compass card 12 on which the true course may be read against the fixed index 13.

Means are provided for adjusting the position of a pin 56 through a small angle relative to the card 12 around the axis of shaft 6'. As shown, pin 56 is mounted in a lever 57, pivoted on shaft 6', the relative angular positions of card 12 and lever 57 being adjustable by a suitable adjusting worm screw 58, which is carried in bearings in the boss 59 at the back of card 12. The screw 58 is turned by means of milled wheel 60 for altering the adjustment which is shown by a scale 61 and pointer 62. In this way the correction for compass "damping error" may be introduced.

The pin 56 engages in a radial slot in a secondary compass card 12' fixed to shaft 6 and coupled by gearing 63, 63' to the rotor of the receiver 5'. Rotation of shaft 6' causes rotation of shaft 6, so that a follow-back connection exists from servomotor 34 to its controller 5'.

The receiver 5' and the bearing brackets 64, 64' for shaft 6 are mounted on a carriage 65 slidably mounted transversely in guides 66, 67. The position of carriage 65 in the guides is determined by screw 68, and is set by thumbscrew 69, being shown by the reading of an index 70 against a scale of corrections 71. The scale 71 may be set-out in terms of ship's speed against latitude, or alternatively, in correction numbers, the correct setting then being ascertainable from tables.

By means of the adjustment of carriage 65 transversely of receiver 5', shaft 6 is displaced to an eccentric position relative to shaft 6', whereby shaft 6 turns through an angle differing from that turned through by shaft 6' by an amount which will correct for the north-steaming error of the compass, provided that the eccentricity is suitably adjusted.

The arrangements for synchronizing the system of Fig. 4 are similar to those of Figs. 1 and 2, except that the "uncorrected" card readings are read on card 12' against the index 29 fixed to the carriage 65.

Figure 5:
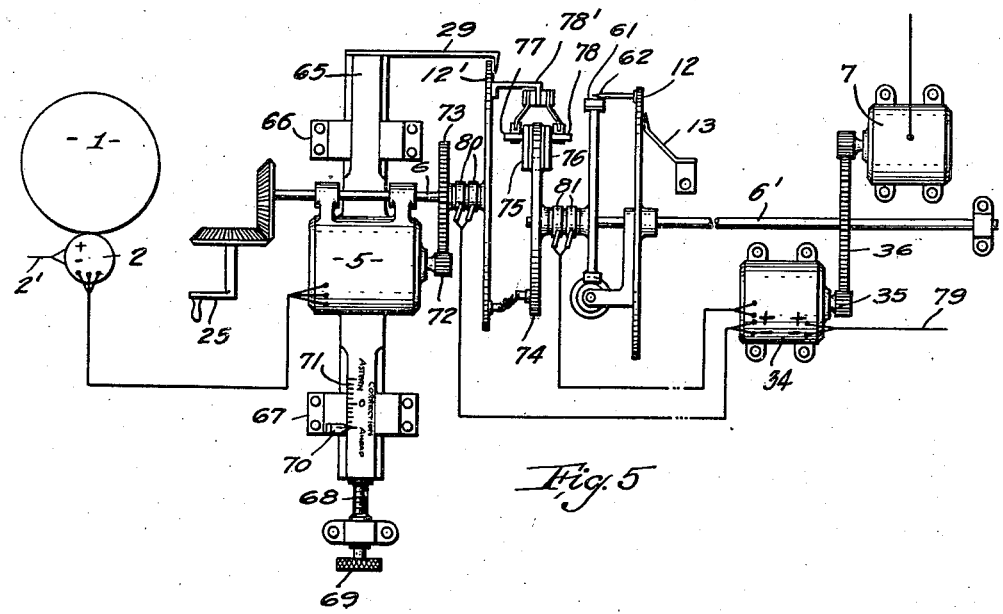
Fig. 5 shows a system similar to that of Fig. 4.

In Fig. 5, a system is illustrated very similar to that of Fig. 4; it is distinguished by the fact that the controller for the servo motor 34 is not the receiver, but is a two-part controller, of which one part is moved with or by the card 12 and the other with or by the card 12'. As shown, the servo motor 34 is a direct current motor and the two-part controller is of the contact-making type.

The transmitter 2 geared to the compass 1 is of the step-by-step type supplied from a direct current supply 2' and transmits to a receiver 5, and turns the "uncorrected" shaft 6 and card 12' through gearing 72, 73. The servo motor 34 turns the "corrected" shaft 6' and card 12 through gearing 35, 36. The axis of shaft 6 can be offset from the axis of shaft 6' by sliding the carriage 65 in the guides 66, 67, as in the system of Fig. 4, to provide a desired correction. Mounted on the shaft carrying card 12 is a disc 74 carrying contact segments 75, 76, which cooperate with contact rollers 77, 78 mounted on a bracket 78' secured to card 12'. The servo motor 34 is controlled by the relative angular position of the contact segments 75, 76, and rollers 77, 78. Many circuit arrangements are known which are suitable for this purpose. Preferably, servo motor 34 has a continuously energized field winding, the contact arrangement being such as to pass current in one direction or the other through the armature according to the direction of rotational displacement of card 12', relative to card 12, from their position of correspondence. As shown in Fig. 5, the direct current supply mains 79 are connected to the motor 34 to energize the field windings, and thence they are connected through current-limiting resistors, (not shown), to slip-rings 80 on a shaft connected to card 12', and thence to the rollers 77, 78. The armature of motor 34 is connected to slip-rings 81 on a shaft coaxial with and connected to shaft 6' and card 12, and thence to the contact segments 75, 76. Segments 75, 76 are arranged in pairs, the segments of one pair 75 being on one side of disc 74 and being separated by a narrow radial slot, while segments of the other pair 76 are on the other side of disc 74 and are separated by a similar slot; the two slots are in the same axial plane. Diagonally opposite segments of the two pairs are connected to each other, so that the whole arrangement acts as a change-over switch in which the supply mains 79 are connected to the armature of motor 34 through resistances, with one polarity or the other according to the direction of departure of discs 12', 12 from their position of correspondence. The motor 34 is therefore always caused to run so as to restore the system to such position of correspondence and, in so doing, turns shaft 6' through a different angle from that turned through by shaft 6, thus introducing the desired correction.

A synchronizing handle 25 for initially setting the system is provided for forcibly turning shaft 6, until card 12', as read against index 29, matches the reading of the compass 1.

In the systems of Figs. 1, 2, 4 and 5, and similar systems in which the servo motor 34 is directly coupled to the transmitter 7 and the corrector, or similar device for ensuring non-proportionality, is in the repeat-back from the servo motor to its controller it is important to prevent lost motion in the repeat back, otherwise any attempt to ensure high sensitivity, in order to obtain accuracy in working, will result in "hunting" of the system. For this reason we spring-load the whole corrector mechanism, and preferably also the gearing, so as to keep all the parts under tension in one direction.

In Fig. 1 there is shown a spring 82, one end of which is attached to a fixed support 83, while the other is attached to a wire or tape passing round a sleeve 84 forming an extension of the stator of receiver 5'. The spring tension tends to rotate the stator. It is less easy to spring-load the system of Fig. 2, since it is difficult to avoid lost motion in the mechanical differential 33. In the system of Fig. 2, we employ a reversing gear 85 between differential 33 and receiver 5' in order that shafts 6 and 6' shall turn in the same direction, and thus that the use of spring tension constraint may be facilitated.

As shown in Fig. 6, the differential 33 of Fig. 2 adds the movements of the rack member 20 and that of shaft 6' to produce rotation of the hollow shaft 86. This movement is led into the reversing gear 85, which is similar in construction to the differential 33, but has its casing fixed. The shaft 6' is continued through the hollow shaft 86, and is linked to shaft 6 by the coiled spring 87, which is biased to apply a torque in the same sense whatever be the amount of correction introduced between shafts 5 and 6'.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having now particularly described and ascertained the nature of our said invention and in what manner the same is to be performed, we declare that what we claim is:

1. A system for correcting for the North steaming and other errors of a gyro compass at a repeater compass comprising a master compass, a variable controller for retransmitting signals received from a transmitter at the master compass proportional to the deviation thereof, a motor positioned by the signals transmitted by said controller, a relay transmitter directly actuated by said motor, a repeater compass at a remote position from the master compass, controlled from said relay transmitter, an error correction device actuated by said motor, differentially controlled means for positioning said variable controller through said correction device and through direct operation of said motor to obtain a corrective signal from the controller for said motor and thereby correct the directly actuated relay transmitter and the repeater compass controlled therefrom so that the repeater compass gives a directional indication free of error.

2. A system for correcting for the North steaming and other errors of a gyro compass at a repeater compass comprising a master compass, an adjustable signal generator for retransmitting signals received from a transmitter at the master compass proportional to the deviation thereof, a motor positioned by the signal transmitted by said signal generator, a relay transmitter directly actuated by said motor, a repeater compass at a remote position from the master compass, controlled from said relay transmitter, an error correction device actuated by said motor, differentially controlled means for adjusting said signal generator operable directly by said correction device and by said motor to obtain a corrective signal from said generator and thereby correct the directly actuated relay transmitter and the repeater compass controlled therefrom so that the repeater compass gives a directional indication free of error.

3. A system for correcting for North steaming and other errors of a gyro compass at a repeater compass card comprising a master compass, a variable controller for retransmitting signals received from a transmitter at the master compass proportional to the deviation thereof, a motor positioned by the signal transmitted by the controller, a repeater compass card rotated by said motor, an error correction device actuated by said motor, differentially controlled means for positioning said variable controller through said correction device and through direct operation of said motor to obtain a corrective signal from the controller for said motor and thereby directly correct the position of said repeater compass card so that the same gives a directional indication free of error.

4. A system in accordance with claim 1 in which the rotor of said controller and the rotor of said relay transmitter are mounted on the same shaft.

5. A system in accordance with claim 3 in which said controller is an electric signal generator having a rotatably adjustable stator actuated by said correction device and a rotor actuated by said motor.

6. A system in accordance with claim 3 in which said controller is an electric signal generator having a rotor which is positioned by a mechanical differential, separate portions of which are respectively actuated by the correction device and by the motor.

7. A system in accordance with claim 1 in which the correction device is provided by locating the controller and motor so that their respective cooperating shafts are arranged in adjustable eccentric relationship.

WILLIAM G. HARDING.
ROBERT H. NISBET.